(12) United States Patent
Kaeseler

(10) Patent No.: US 8,742,281 B2
(45) Date of Patent: *Jun. 3, 2014

(54) SPOT WELDING CAP CHANGER

(71) Applicant: Joe Ruggiero, Oakville (CA)

(72) Inventor: Werner Kaeseler, Baunatal (DE)

(73) Assignee: 002152706 Ontario Ltd., Oakville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,915

(22) Filed: Nov. 19, 2012

(65) Prior Publication Data

US 2013/0240489 A1 Sep. 19, 2013

Related U.S. Application Data

(63) Continuation of application No. 11/997,131, filed as application No. PCT/EP2006/064417 on Jul. 19, 2006, now Pat. No. 8,314,356.

(30) Foreign Application Priority Data

Jul. 28, 2005 (DE) .......................... 10 2005 035 915

(51) Int. Cl.
 *B23K 9/26* (2006.01)
(52) U.S. Cl.
 USPC ........................................ 219/86.1; 219/86.8
(58) Field of Classification Search
 None
 See application file for complete search history.

(56) References Cited

U.S. PATENT DOCUMENTS

| 4,794,221 | A | 12/1988 | Takabe et al. |
| 5,073,692 | A | 12/1991 | Jackson et al. |
| 5,495,663 | A | 3/1996 | Saito |
| 5,530,218 | A | 6/1996 | Nakamura et al. |
| 5,734,141 | A | 3/1998 | Voilmy et al. |
| 7,353,578 | B2 | 4/2008 | Nakajima et al. |
| 8,314,356 | B2 * | 11/2012 | Kaeseler ................ 219/86.1 |

FOREIGN PATENT DOCUMENTS

| DE | 101 24 243 C1 | 11/2002 |
| DE | 102 22 248 A1 | 11/2003 |
| FR | 2 760 392 A1 | 9/1998 |
| WO | 2004/035251 A2 | 4/2004 |

* cited by examiner

*Primary Examiner* — Kiley Stoner
(74) *Attorney, Agent, or Firm* — Browdy and Neimark, PLLC

(57) ABSTRACT

The invention relates to a spot welding cap changer (1) with a cap puller (2) and two cap magazines (3, 3A), the cap puller (2) having a gripper (20) with spring-loaded, pivotable jaws (21, 22), which in response to a turning and axial pulling-off movement detaches a spot welding cap (K) of a pincer spot welding head introduced into it from a shaft of the pincer welding head in such a way that it is clamped to prevent it twisting, and the cap magazines (3, 3A) holding spot welding caps respectively in a round cap carrier (31) such that they are circularly arranged in a directed and oriented manner and are respectively transported individually one after the other into an access position against a stop (32) by an advancing force (P).

27 Claims, 5 Drawing Sheets

SPOT WELDING CAP CHANGER

This application is a continuation of application Ser. No. 11/997,131, filed on Jul. 30, 2008, now U.S. Pat. No. 8,314,356.

The invention relates to a spot welding cap changer with a cap extractor and two cap magazines, the cap extractor having a gripper with spring-loaded, pivoting jaws, which in response to a turning and axial extraction movement detaches a spot welding cap of a pincer spot welding head inserted into it from a shaft of the pincer welding head in such a way that it is clamped to prevent twisting, and the cap magazines holding spot-welding caps in a cap carrier in such a way that they are circularly arranged in a directed and oriented manner and are one by one transported by an advancing force against a stop, into an access position allowing to attach them axially to the free shaft of the pincer and to extract them with it.

Such a mechanical electrode cap changer is known from the DE 102 22 248 A1. It has a two-part cap extractor, accessible from both sides, in a body separate from the magazine.

Since gravity causes the caps to slide against a cap stop, the device can only be operated stationary in the vicinity of a mobile welding robot. Changing caps at a stationary pincer spot welding head, to which each component is fed by a robot for welding, is therefore not possible. The pincer spot welding heads/welding installations often have short shafts, which are for instance curved, so that the cap extractor, equipped with three large jaws and accordingly big, cannot be positioned for extraction.

It is the object of the invention to provide for an automatic faster and safer exchange of the spot welding caps both at mobile and stationary spot welding installations with a short access distance.

The solution resides in that the cap extractor has two opposed grippers, each with jaws that are open at their ends and can be rotated towards each other with approximately parallel toothed grip surfaces whose distance is slightly smaller than a diameter of a spot welding cap, and each cap magazine contains a cap carrier, which, driven by a spring box, presses by way of its advancing force one of the caps respectively against the stop, and in the access position a rim overlap overlaps the cap on one side.

Advantageous forms of the invention are indicated in the subclaims.

In the new embodiment the cap extractor and the magazine are mounted on a support which preferably is spring-mounted. In contrast to the known system, the new construction design gives the possibility not only to be used at welding robots, but also at stationary pincer welding heads or welding installations.

Compared with the known clamping system with three jaws, the new cap-extraction installation provides for shorter clamp and spin travels, therefore much shorter intervals for detaching the caps. Moreover, from the smaller design results a wider array of application, for instance at non-standard pincers or very short, curved shafts.

The two cap extractors are each open at the ends of the jaws and thus accessible to a cap. The jaws grip it directly by way of the undersize of their distance and detach the cap, whereby a rotation around an angle of about 30-60° suffices. This way a cap change is possible even in extremely narrow confines. Since the two grippers are oriented in opposite directions, respectively one of them is accessible from the various sides in a clockwise rotation, so that no turning of the pincer is necessary, even if the pincer shafts are screwed on.

Furthermore, the round magazine is much more compact than the straight magazine functioning by gravity of the known installation. It can be held and operated in any position because of the spring drive.

Furthermore, the two round magazines arranged on parallel axes provide in each case for an access with short radial travel to the access positions in the access openings. In an embodiment with a magazine cover, this cover is directly shifted during access, far enough to let the rim overlap uncover the cap frame, so that the detaching is possible. The example shows a radial infeed and an axial access of the shafts into the magazine.

Both partial devices, the cap changer, and the cap magazine, are mounted on a support close to one another, and thus can be set up stationary, or mounted to a robot arm in a fixed or detachable manner. In the first case the welding robot changes the caps of its own pincer, and in the second case the robot changes the caps at the stationary pincers or installations respectively by means of the device. The changing device at the robot arm is movably mounted, constantly ready for operation in a free space next to the gripper of the robot or on a guide rail, or it is located in a parking position, where it can be picked up and brought to operation by the gripper; this is called alternating pincer principle.

Advantageously, cap sensors are arranged on the device, which indicate whether a cap is in place or not. Moreover, the charging level of the magazines is monitored. This way it is ensured that after a cap change a cap is in place at the shaft of the pincer welding head before the cooling water is switched on. Furthermore it can be verified, whether the old cap was removed, when it is reported that there is no cap in place while the shaft is approaching.

The embodiment of the cap magazine without a cover holds the welding caps in an elastic cap carrier in a close fit, axially movable by propulsive or tractive force.

Advantageous embodiments are represented in the FIGS. 1 to 6.

FIG. 2A, 2B show detailed enlargements of the grip surfaces;

FIG. 6 shows a top view of the magazine cover.

Figure 1:
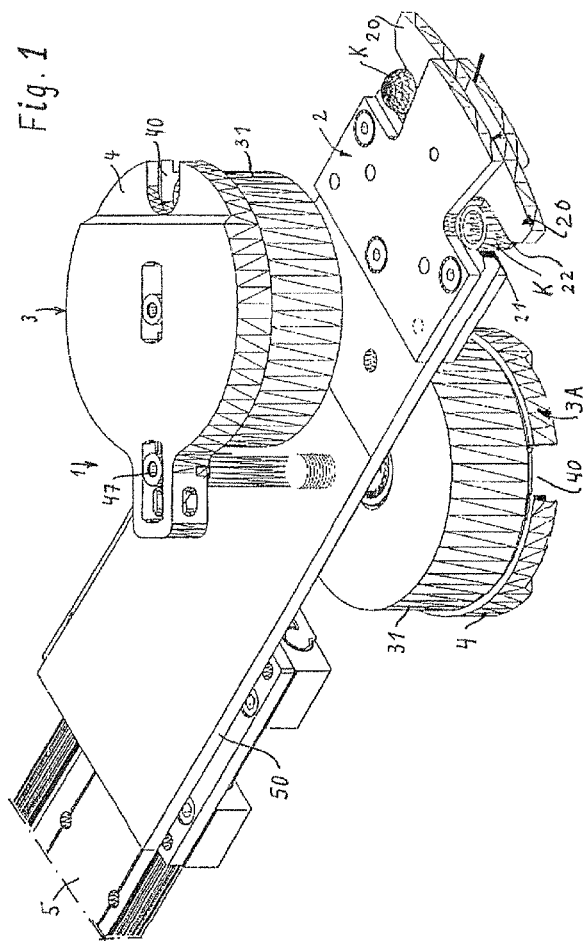
FIG. 1 shows the entire device schematically and in perspective.

FIG. 1 shows a complete spot welding cap changer 1, which is movably held on a support rail 5 at a robot arm. Alternatively, it is firmly mounted with the mounting plate 50. The bilaterally equipped cap extractor 2 is bolted at the free end of the mounting plate 50, with the two grippers 20 respectively on the sides, their direction opposite to one another. Pulled off caps K are depicted between the jaws 21, 22, after being detached at the rim of a storage container they drop into it.

Offset to the rear from the cap extractor 2 respectively one cap magazine 3, 3A laterally offset to the other is mounted on the mounting plate 50, with the magazine cover 4 respectively directed laterally and the access openings 40 oriented axially parallel to the extracted welding caps K that are still held by the gripper, so that the shafts of the pincer spot welding head have to travel only short distances while changing the caps.

Figure 2:
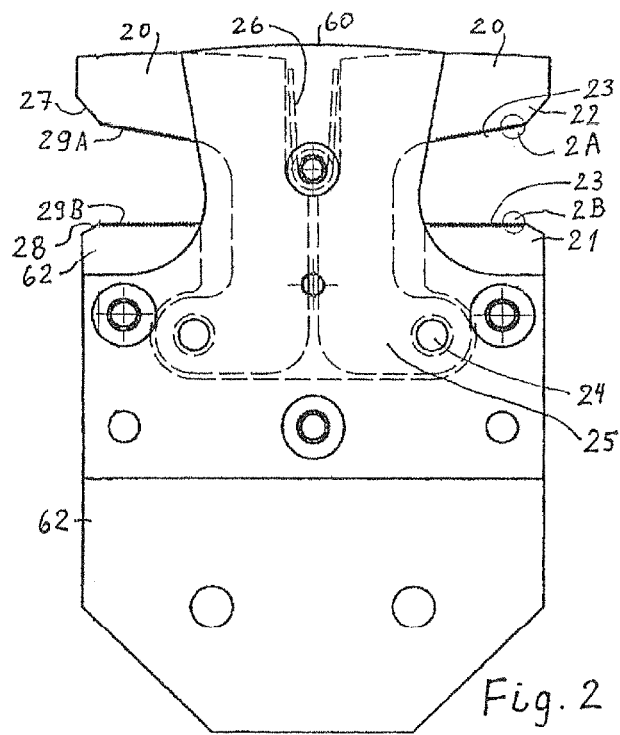
FIG. 2 shows a transparent top view of the cap extractor.

FIG. 2 shows a top view on the cap extractor 2, which consists of very few parts. The grippers 20 are composed of one fixed, toothed jaw 21 respectively, and one jaw 22 which is mounted in such a way that it can be pivoted towards said jaw 21. The pivot joint 24 is located behind the fixed jaw 21 by way of a U-shaped structure of the movable jaw arm 25, so that a cap K positioned in the gripper 20 will be clamped at a twist depending on the direction of rotation.

The initial pressing force of the jaws 21, 22 is caused by a bracing spring 26, which for example, is formed as a spiral or bracing spring with spread ends, each pressing against a jaw arm 25.

On the infeed side the grippers 20 are provided with infeed skews 27, 28. From these extend the roughly parallel grip surfaces 23, each with a toothing in opposite direction 29A, 29B, as FIGS. 2A and 2B show in partial view and in detail. If there is no cap K inserted in the grippers 20, then the distance A of the grip surfaces 23 has a minor undersize compared to the cap outside diameter D.

Figure 3:
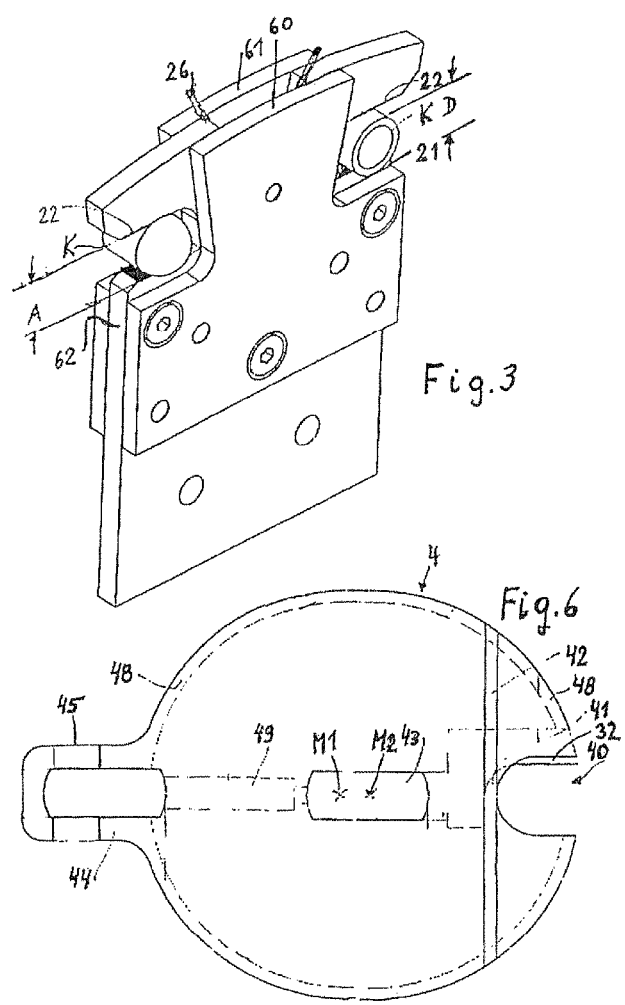
FIG. 3 shows a perspective of the cap extractor.

FIG. 3 shows that the spring 26 and the movable jaws 21, 22 as well as a jaw plate 62, on which the fixed jaws 21 are formed, are held between two cover plates 60, 61. The jaw plate 62 has a corresponding cavity, in which the U-shaped jaw arms 22 have free space to move.

Figure 4:
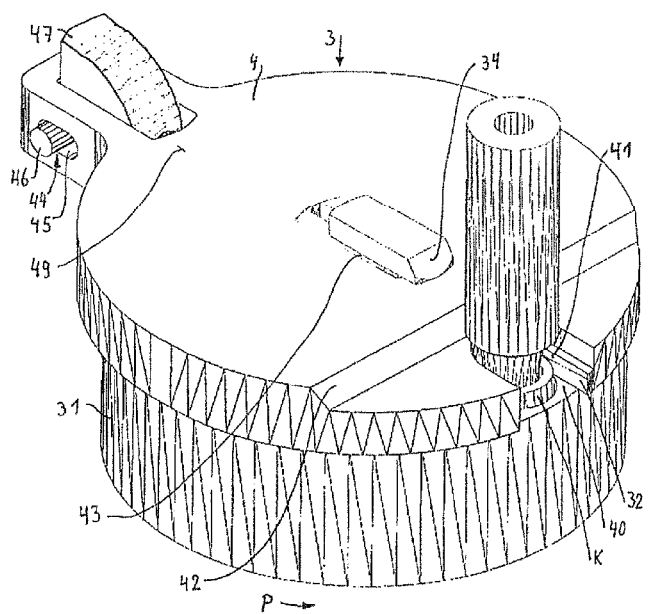
FIG. 4 shows a cap magazine in perspective, closed, enlarged.

FIG. 4 shows a round cap magazine 3, which consists of a barrel shaped cap carrier 31, closed with a magazine cover 4, whereas a radial section remains free up to the rounded access opening 40, in which a welding cap K in the withdrawal position is pressed to the edge of a stop 32 at the cover.

The cover 4 has a small rim overlap 41 of the cap frame in the curve of the access opening 40, an induct skew 42 connecting to said rim overlap which is cascaded to the top side of the cover. At an embodiment with a hinged cover 4, a slot 43 is formed, through which reaches a bracket 34, bevelled on the outside, which keeps the cover shut.

On the other side of the access opening 40 a hinge 44 with a slotted hole 45 is formed in the extension level of the cover, the cones 46 of said hinge being held in a hinge support 47.

Figure 5:
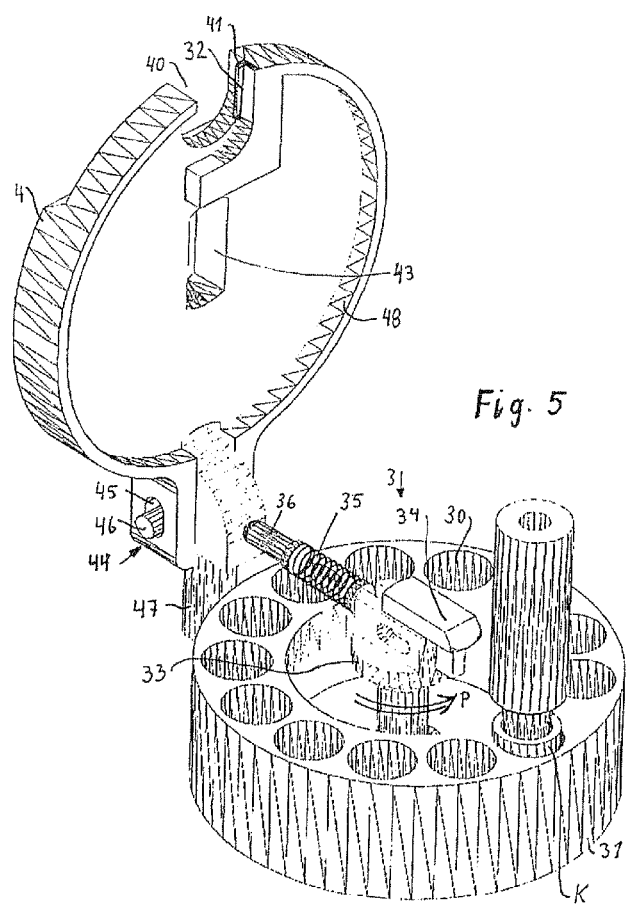
FIG. 5 shows a cap magazine in perspective, open, enlarged.

FIG. 5 shows the open round magazine 3 with a hinge and equipped with a welding cap K in the drill holes 30 of the cap carrier 31, the cap K protruding by a few millimeters. A firmly mounted spring box 33, schematically depicted, is in the centre of the cap carrier 31, said spring box carrying the bracket 34 so that it can be radially moved. A preloaded spindle or spiral spring is arranged centrally in the spring box 33, one end of the spring being fixed to the spring box 33, the other to the cap carrier 31, so that the latter is pressed with a torsion force P in the direction of the stop 32, which extends radially on the magazine cover.

The plate-shape bracket 34 extends in a diagonal guiding slot on the cover of the spring box 33. In the closed state, as shown here, a compression spring arrangement 35, held in the cover, extends from the bracket 34 and is supported by means of a support pin 36 on the rounded hinge support 47, and presses the bracket 34 in the closed position, in which it overlaps the cover 4 in the closed state and holds the rim overlap 41 in the overlap position, the cone 46 being in the rear stop position in the slotted hole 45, as FIG. 1 shows. To open the cover 4, the bracket 34 is pushed back manually. Alternatively, the round magazine can be implemented without a hinge for the opening of the cover. In this case the cover is only held in a movable manner, so that the shaft of the pincer, when inserted, slides the cover by the skew 42 to release the rim overlap.

FIG. 6 shows a top view on the magazine cover 4, whose main outline consists of two semi-circles with shifted centres M1, M2, whereby on one side the access opening 40 extends in the direction of the centre, and on the opposite side the hinge 44 extends on the outside. The slot in the cover 43 extends 4 in the central area in the direction between the access opening 40 and the hinge 44. The bracket 34 in the cover and in the fixed spring box 33 is guided in this direction. The cover 4 is about 15 mm high and largely hollow shaped and has a stiffening cover rim 48, which passes into the stop 32 and on the other side into the hinge 44. The cover 4 is lowered at the induct skew 42 by about 5 mm to the infeed area. Internally, the cover surface drives the caps to the withdrawal level when turned in the stop position. A chamber 49, which contains the compression spring arrangement 35, is represented with a dashed outline.

The compact construction of the cap extractor with the magazines allows for a significant reduction of the changing times, for example, from 22 to 17 sec, which corresponds to about 23%.

LIST OF REFERENCE SIGNS 1 spot welding cap changer
2 cap extractor
20 gripper
21, 22 jaws
23 grip surfaces
24 pivot joint
25 jaw arm
26 bracing spring
27, 28 infeed skews
29A, 29B toothing
3, 3A cap magazine
30 drill holes
31 cap carriers
32 stop
33 spring box
34 bracket
35 compression spring
36 support pin
4 magazine cover
40 access opening
41 rim overlap
42 induct skew on the cover
43 slot in the cover
44 hinge
45 slotted hole in the hinge
46 cones
47 hinge support
48 cover rim
49 compression spring chamber
5 support rail
50 mounting plates
60, 61 cover plates
62 jaw plate
A gripping jaw distance
D outside diameter of the caps
K cap
P advancing force
M1, M2 semicircle centres

The invention claimed is:
1. Spot welding cap changer comprising:
a cap extractor and two cap magazines, the cap extractor having:
a gripper with spring-loaded, pivoting jaws which in response to a turning and axial extraction movement detaches a spot welding cap of a pincer spot welding head inserted into the pivoting jaws from a shaft of the pincer welding head in such a way that the spot welding cap is clamped to prevent the spot welding cap from twisting, and the cap magazines holding spot welding caps respectively in a cap carrier in such a way that the spot welding caps are circularly arranged in a directed and oriented manner and are one by one transported by an advancing force against a stop, into an access position allowing the spot welding caps to be attached axially to the free shaft of the pincer and to extract them with the free shaft of the pincer, wherein the cap extractor has two opposed grippers, each with jaws that are open at their ends and can be rotated towards each other with approximately parallel toothed grip surfaces whose distance is smaller than a diameter of a spot welding cap, and each cap magazine has a cap carrier which, driven by a spring box, presses by way an advancing force one of the caps respectively against the stop.

2. Spot welding cap changer according to claim 1, wherein respectively one of the jaws of the corresponding gripper is fixed at a jaw plate, and the corresponding movable jaw is formed at an U-shaped jaw arm, which is supported with a pivot joint behind the fixed jaw.

3. Spot welding cap changer according to claim 2, wherein between the two movable jaw arms, a preloaded bracing spring is mounted.

4. Spot welding cap changer according to claim 1, wherein the jaws have infeed skews.

5. Spot welding cap changer according to claim 4, wherein the grip surfaces in each case have an asymmetric toothing, which on the two parallel jaws is oriented in opposite directions.

6. Spot welding cap changer according to claim 3, wherein the jaw arms, the bracing spring and the jaw plate are held between cover plates.

7. Spot welding cap changer according to claim 1, wherein the spring box contains a spiral or coil spring, one end of which is fixed at the spring box, and the other end of which is fixed at the cap carrier.

8. Spot welding cap changer according to claim 1, wherein a magazine cover is held preloaded by a spring in the direction of the access opening so that the rim overlap overlaps a cap frame in a stop position of the magazine cover.

9. Spot welding cap changer according to claim 8, wherein a bracket is spring-loaded and movably held at the spring box, said bracket reaching through the closed magazine cover and, by overlapping the magazine cover, holding the magazine cover in place.

10. Spot welding cap changer according to claim 8, wherein the magazine cover is articulated at a hinge support, situated opposite of the access opening.

11. Spot welding cap changer according to claim 10, wherein the magazine cover is movably guided in a slotted hole on the hinge support.

12. Spot welding cap changer according to claim 1, wherein the magazine cover bears a stiffening cover rim, which on one side forms the rim overlap and on the other side forms a hinge.

13. Spot welding cap changer according to claim 1, wherein the cap extractor with grippers is mounted on a mounting plate, on which with an offset to the rear the cap magazines are mounted.

14. Spot welding cap changer according to claim 13, wherein the access openings of the cap magazines are directed towards and salient on different sides of the mounting plate, respectively.

15. Spot welding cap changer according to claim 13, wherein the mounting plate is supported and movably guided on a support rail which is mounted on a robot arm or firmly installed.

16. Spot welding cap changer according to claim 1, wherein sensors are arranged at the cap magazines, which send a signal to a control device when a predetermined remaining quantity of spot welding caps is in stock in the respective cap carrier.

17. Spot welding cap changer according to claim 1, wherein the magazine cover bears a stiffening cover rim.

18. Spot welding cap changer according to claim 1, wherein the cap extractor is mounted on a mounting plate.

19. Spot welding cap changer according to claim 9, wherein the magazine cover is articulated at a hinge support.

20. Spot welding cap changer according to claim 13, wherein the mounting plate is supported on a support rail.

21. A cap magazine for use with a cap extractor that detaches a spot welding cap of a pincer spot welding head inserted into the cap extractor from a shaft of the pincer welding head, the cap magazine comprising:
a cap carrier sized and shaped to receive a plurality of spot welding caps in a circular arrangement; and
a spring box for driving the spot welding caps within the cap carrier, the spring box providing an advancing force to advance the caps one by one so that one of the caps bears against a stop in the cap magazine in an access position, the access position allowing the spot welding caps to be attached axially to the free shaft of the pincer welding head and to be extracted from the cap carrier with the free shaft of the pincer, and when the cap in the access position is extracted from the cap carrier, the spring box advances another cap into the access position.

22. The cap magazine of claim 21, wherein the spring box includes a spring, one end of which is fixed at the spring box, and the other end of which is fixed at the cap carrier.

23. The cap magazine of claim 21, wherein a magazine cover is held preloaded by a spring in the direction of the access opening so that the rim overlap overlaps a cap frame in a stop position of the magazine cover.

24. The cap magazine of claim 23, wherein a bracket is spring-loaded and movably held at the spring box, said bracket reaching through the closed magazine cover and, by overlapping the magazine cover, holding the magazine cover in place.

25. The cap magazine of claim 23, wherein the magazine cover is articulated at a hinge support, situated opposite of the access opening.

26. Spot welding cap changer according to claim 1, wherein in the access position, a rim overlap overlaps the cap on one side.

27. The cap magazine of claim 21, further comprising a rim overlap that overlaps the cap in the access position on one side.

* * * * *